United States Patent [19]

Gilmore et al.

[11] Patent Number: 5,207,980

[45] Date of Patent: May 4, 1993

[54] TOP NOZZLE-MOUNTED REPLACEMENT GUIDE PIN ASSEMBLIES

[75] Inventors: Charles B. Gilmore; Walter H. Andrews, both of Columbia, S.C.

[73] Assignee: Westinghouse Electric Corp., Pittsburgh, Pa.

[21] Appl. No.: 782,183

[22] Filed: Oct. 27, 1991

[51] Int. Cl.[5] .............................................. G21C 3/32
[52] U.S. Cl. ..................................... 376/446; 376/364
[58] Field of Search ............................. 376/446, 364; 976/DIG. 48, DIG. 102; 411/53, 133, 161, 175, 178, 364, 929, 968

[56] References Cited

U.S. PATENT DOCUMENTS

| | | | |
|---|---|---|---|
| 3,630,253 | 12/1971 | Sherman | 411/166 |
| 4,094,558 | 6/1978 | Christiansen | 308/3 R |
| 4,292,130 | 3/1979 | Viaud et al. | 176/30 |
| 4,366,116 | 12/1982 | Christiansen et al. | 376/446 |
| 4,416,848 | 11/1983 | Feutrel | 376/260 |
| 4,448,561 | 5/1984 | LePargneux | 403/19 |
| 4,585,613 | 4/1986 | Styskal et al. | 376/260 |
| 4,656,734 | 4/1987 | Styskal et al. | 29/723 |
| 4,664,874 | 5/1987 | Shallenberger et al. | 376/261 |
| 4,664,875 | 5/1987 | Shallenberger et al. | 376/261 |
| 4,692,304 | 9/1987 | Gjertsen | 376/446 |
| 4,750,876 | 6/1988 | Lawson | 425/406 |
| 4,820,479 | 4/1989 | Hornak et al. | 376/446 |

*Primary Examiner*—Donald P. Walsh
*Assistant Examiner*—Meena Chelliah

[57] ABSTRACT

A replacement guide pin assembly is provided for aligning a nuclear fuel assembly with an upper core plate of a nuclear reactor core. One embodiment of the guide pin assembly includes an elongated guide pin body, a ferrule, and a lock screw. The guide pin body has a lower expandable base insertable within a hole in the top nozzle, and capable of expanding radially outwardly relative to a longitudinal axis of the guide pin body to provide an interference fit with the top nozzle. The ferrule is insertable within the top nozzle hole, interfitted with the guide pin body, and capable of imparting a radially and outwardly directed force on its lower expandable base to expand it within the hole of the top nozzle and thereby secure the guide pin body to the top nozzle in response to a predetermined displacement of the ferrule relative to the guide pin body along its longitudinal axis. The lock screw is insertable within the top nozzle hole, interfitted with the ferrule and threaded into the guide pin body so as to produce the predetermined displacement of the ferrule. Another embodiment of the guide pin assembly includes a guide pin body, an expandable insert body, and a ferrule. The guide pin body has a lower attachment base insertable within the top nozzle hole. The expandable body is insertable within the top nozzle hole, interfitted about the lower attachment base of the guide pin body, and capable of expanding radially outwardly relative to a longitudinal axis of the guide pin body to provide an interference fit with the top nozzle. The ferrule is insertable within the hole in the top nozzle, interfitted with the expandable body, and threaded with the lower attachment base of the guide pin body to produce a predetermined displacement of the ferrule relative to the guide pin body along its longitudinal axis sufficient to impart a radially and outwardly directed force on the expandable body to produce expanding thereof within the hole of the top nozzle into the interference fit with the top nozzle and thereby secure the guide pin body to the top nozzle.

34 Claims, 14 Drawing Sheets

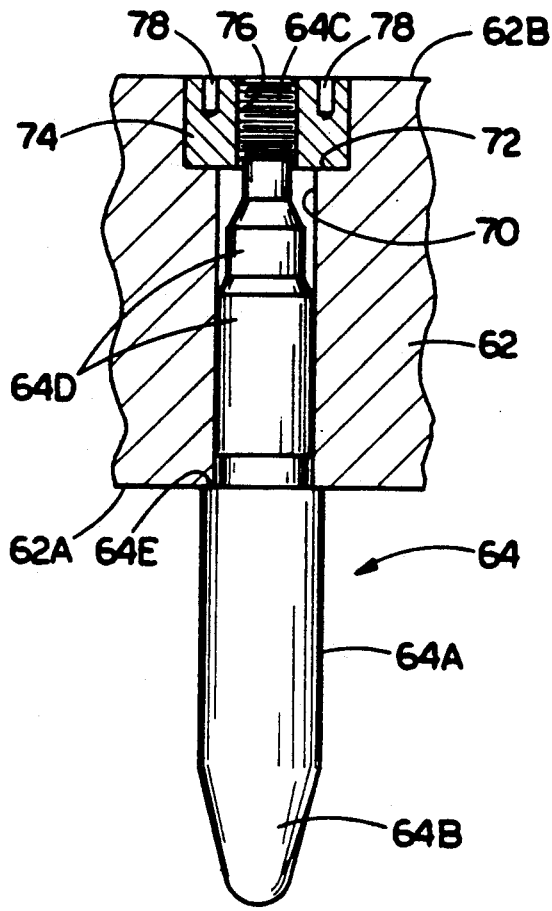
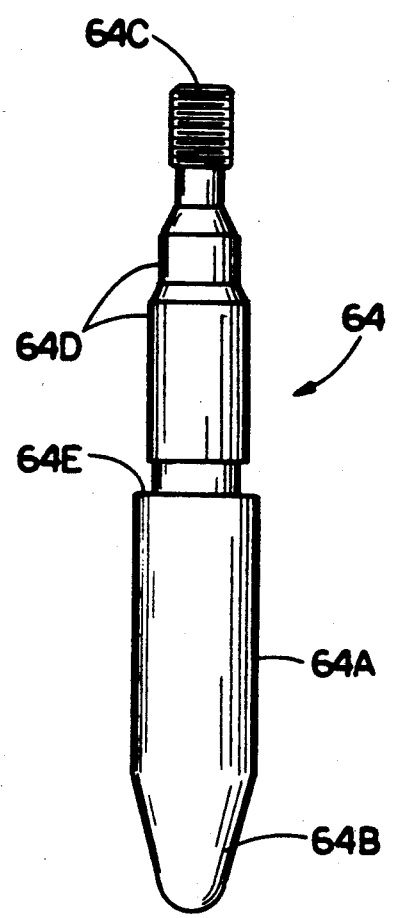
FIG. 4
(PRIOR ART)
FIG. 5
(PRIOR ART)
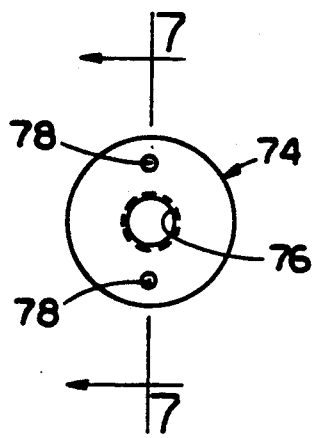
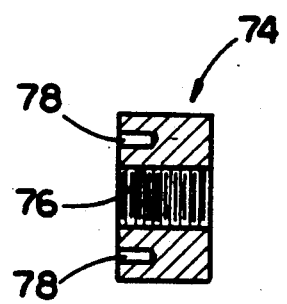
FIG. 6
(PRIOR ART)
FIG. 7
(PRIOR ART)

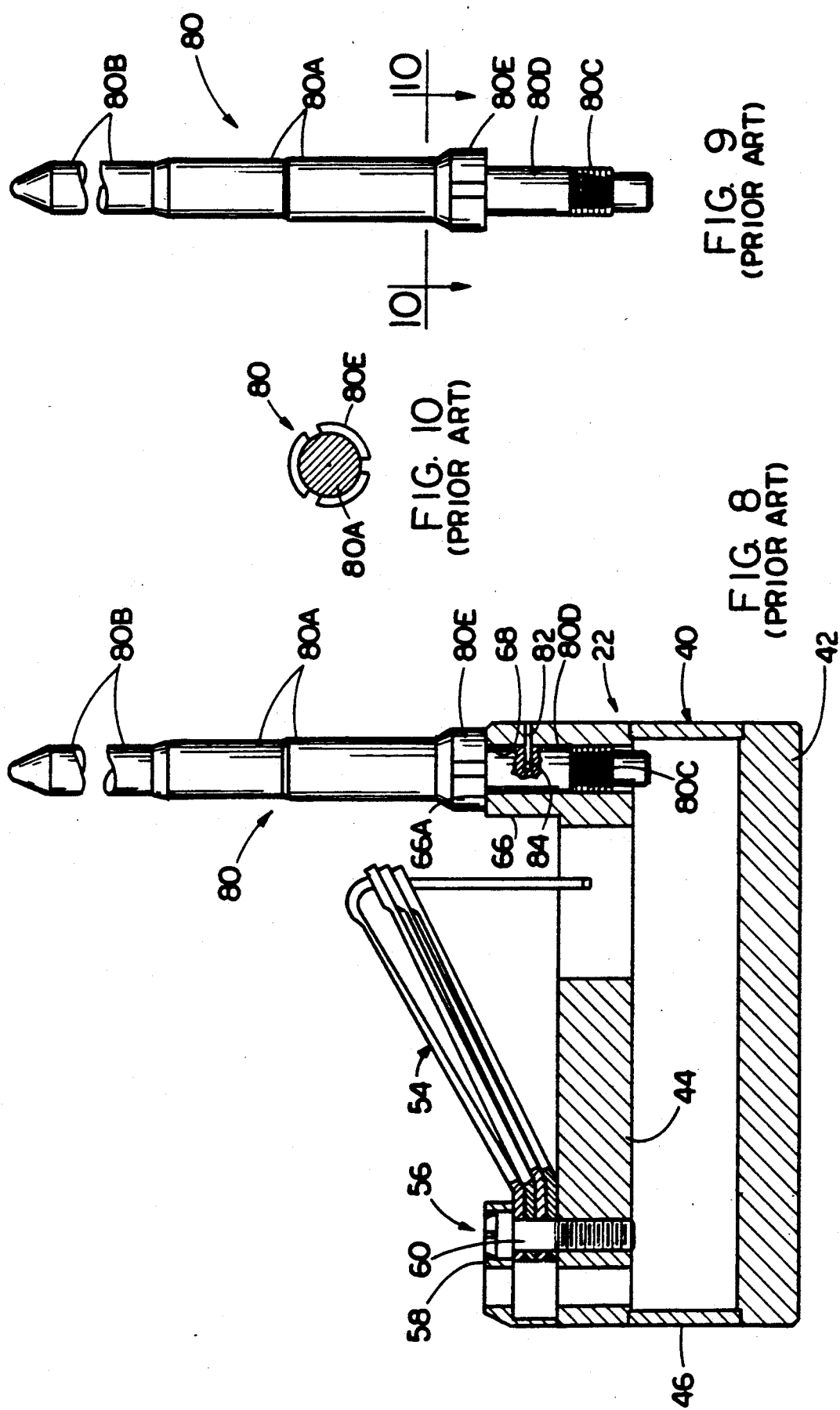

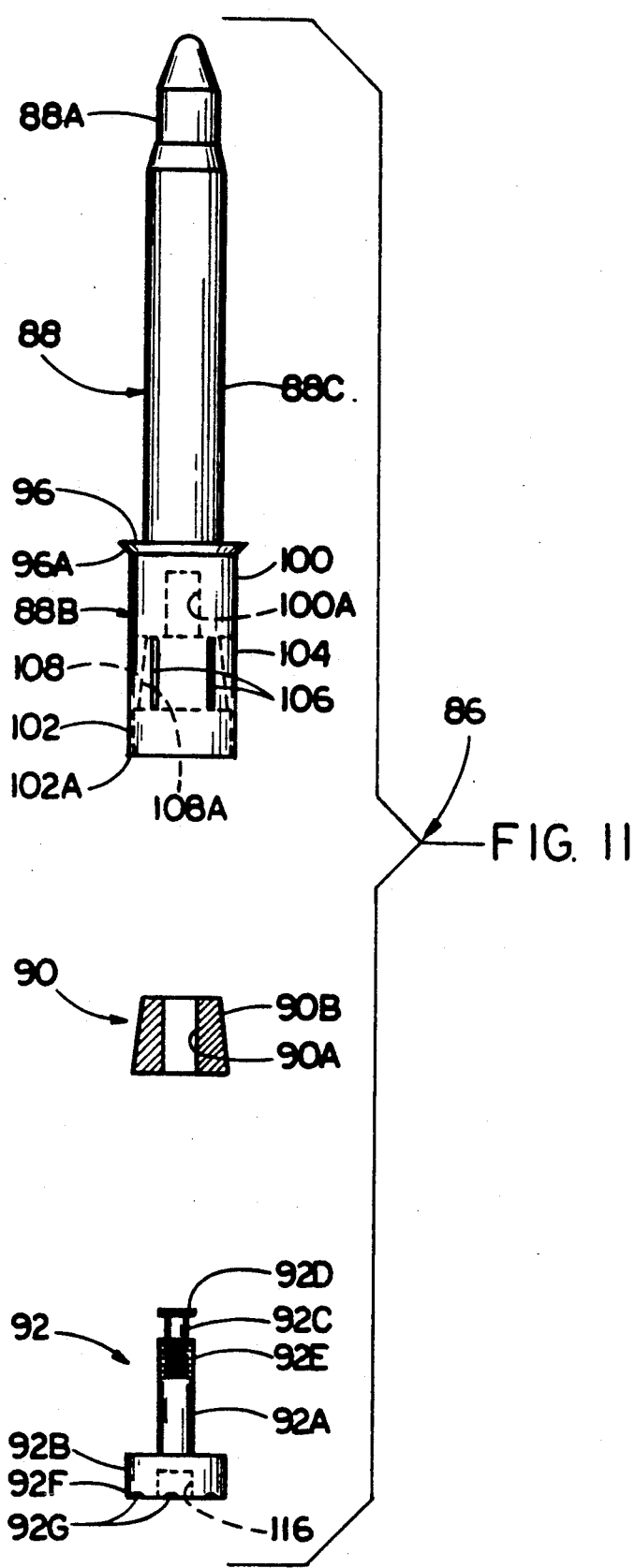

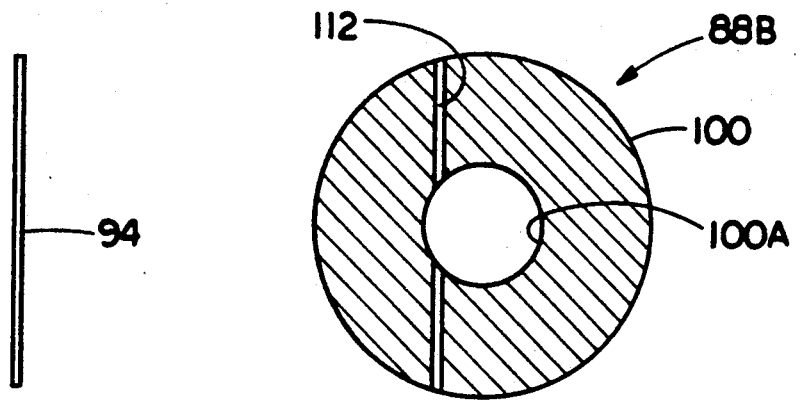
FIG. 23
FIG. 22
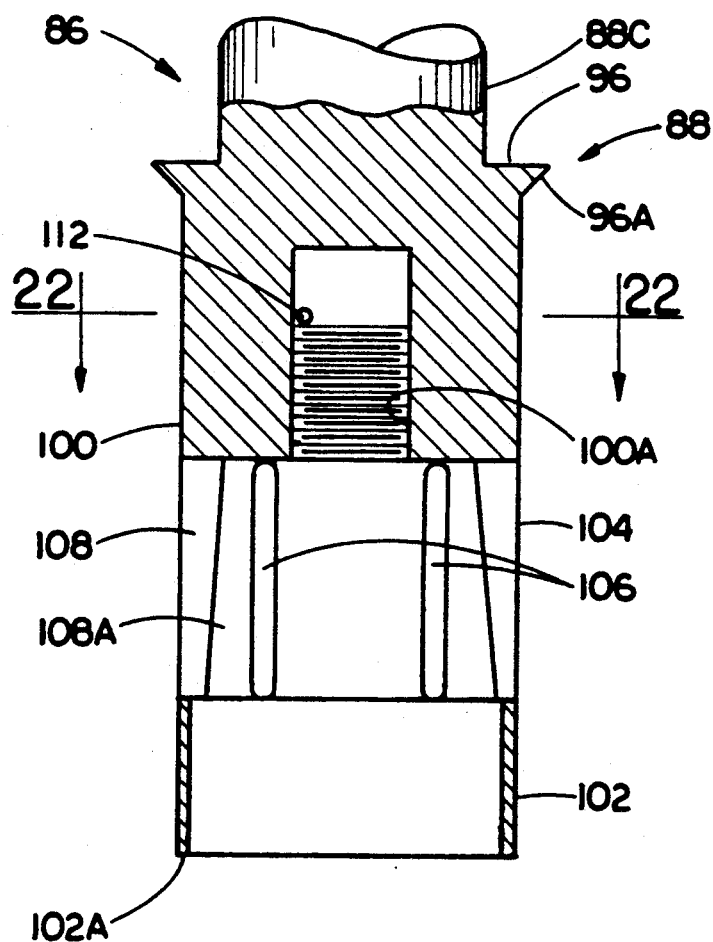
FIG. 21

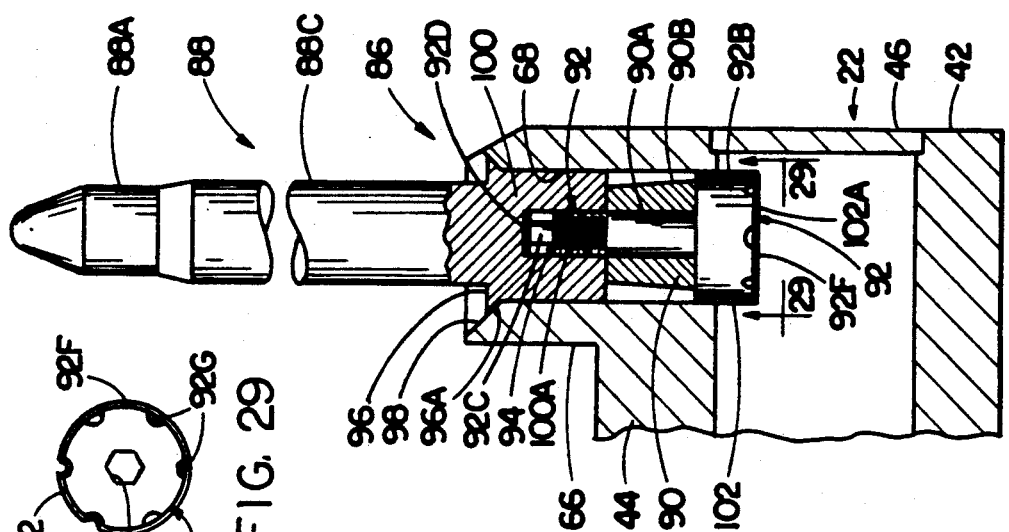
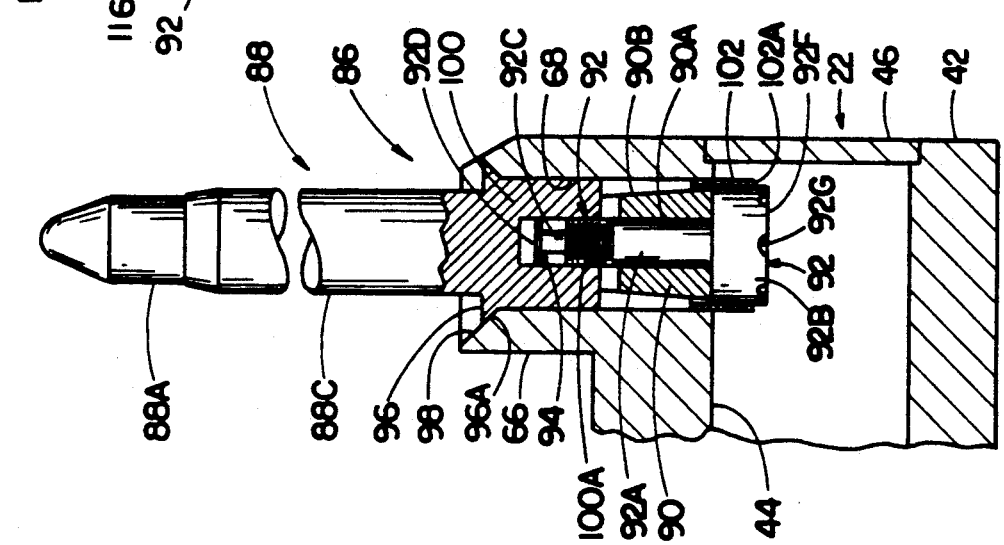
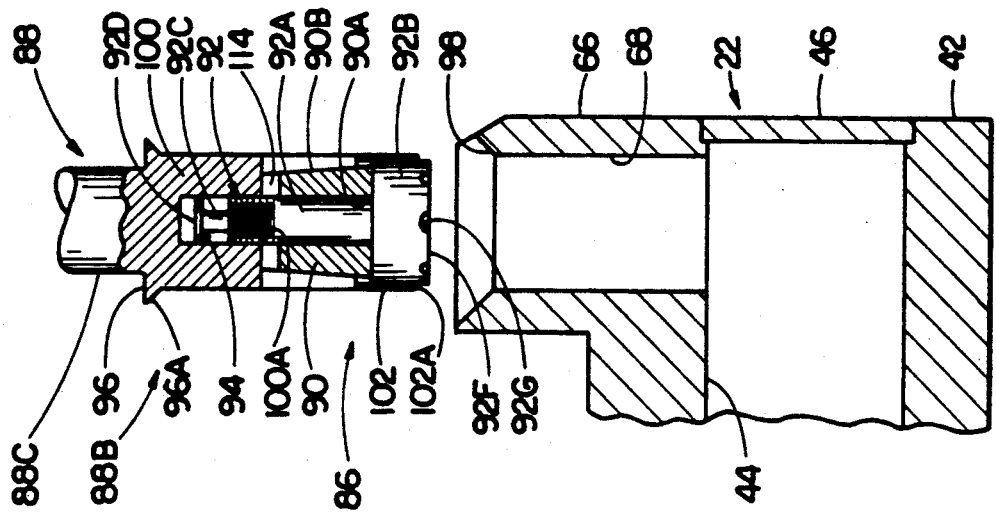
FIG. 28
FIG. 29
FIG. 27
FIG. 26

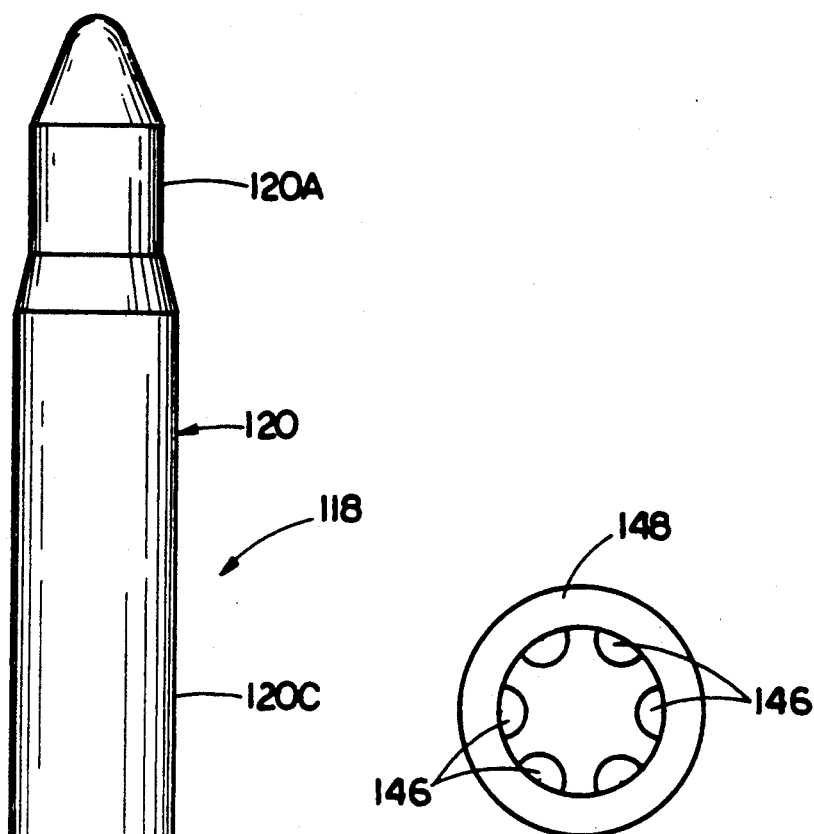
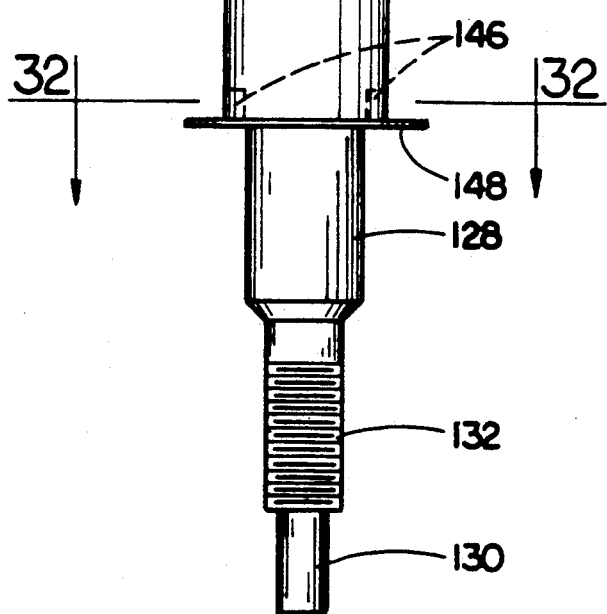
FIG 32
FIG. 31

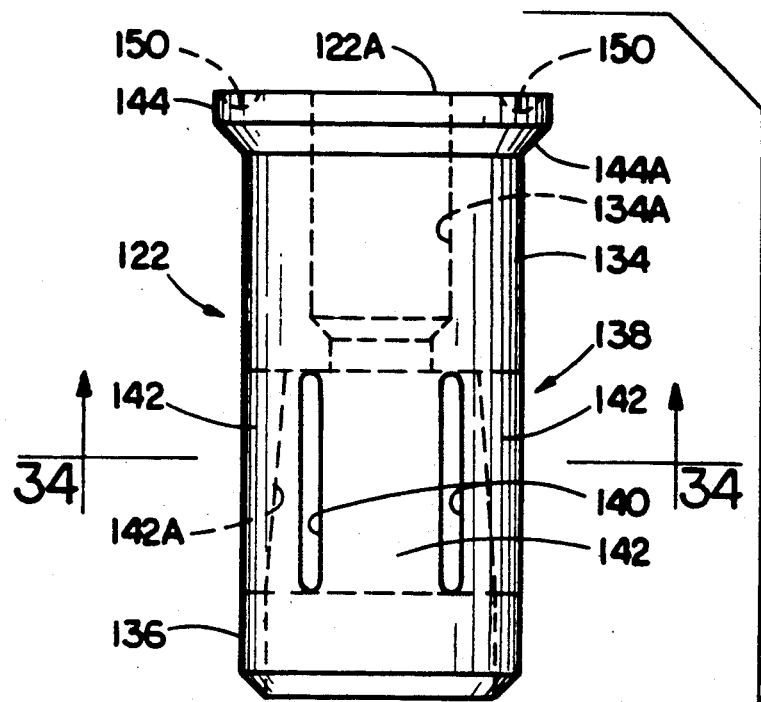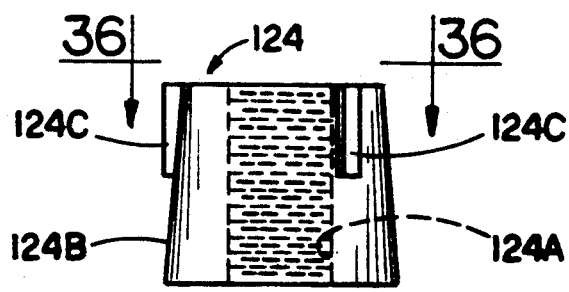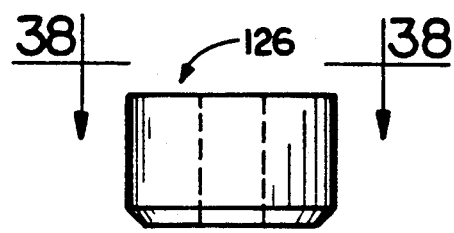
FIG. 33

TOP NOZZLE-MOUNTED REPLACEMENT GUIDE PIN ASSEMBLIES

BACKGROUND OF THE INVENTION

1. Field of the Invention

The present invention relates generally to nuclear fuel assemblies and, more particularly, is concerned with top nozzle-mounted replacement guide pin assemblies for alignment of fuel assemblies with an upper core plate.

2. Description of the Prior Art

A pressurized water nuclear reactor (PWR) typically includes a nuclear reactor core composed of a large number of nuclear fuel assemblies supported between vertically spaced upper and lower core plates. The upper and lower core plates are supported by a core support barrel which surrounds the reactor core. The fuel assemblies are arranged in vertical orientations and in side-by-side relationship.

A typical fuel assembly includes a plurality of fuel rods held in a stationary array by a skeleton of the fuel assembly. The fuel assembly skeleton is composed of a plurality of control rod guide thimbles disposed between and extending parallel to the fuel rods, a plurality of grids mounted to and axially spaced along the guide thimbles and supporting the array of fuel rods, and top and bottom nozzles disposed adjacent to and attached at opposite ends of the guide thimbles.

The top nozzle of the fuel assembly is an enclosure or housing formed by a transversely extending lower adapter plate and an upper annular flange with an upstanding sidewall extending between and integrally interconnecting the adapter plate and flange at their respective peripheries. The lower adapter plate is provided with one plurality of holes to permit the flow of coolant upward through the top nozzle and another plurality of holes to receive the upper ends of the guide thimbles which, in turn, are attached to the lower adapter plate. The upper annular flange defines a central top opening of the top nozzle within which may be disposed a rod cluster control assembly (RCCA). The RCCA contains a plurality of control rods which can be inserted into and withdrawn from the guide thimbles of the fuel assembly through the set of holes in the lower adapter plate receiving the upper ends of the guide thimbles. The upper annular flange also has two holes disposed in two of the diagonal corners of the top nozzle which mate with guide pins mounted in the upper core plate.

The guide pins disposed between the upper core plate and top nozzle of each fuel assembly provide proper alignment and engagement of the fuel assembly with the upper core plate so that the guide thimbles of the fuel assembly will extend vertically in alignment with the control rods for receiving the control rods from above. In the event a guide pin should incur damage affecting the proper alignment of the fuel assembly, this may adversely impact the capability to move the control rods into the guide thimbles of the fuel assembly. Thus, it would be highly desirable to be able to take steps to replace the damaged guide pin.

However, attempts to perform in-situ guide pin repair and replacement have not been pursued in view of the following obstacles which are a result of prior art guide pin designs. First, all procedures must be performed remotely underwater due to unacceptably high levels of radiation. Second, duplication of original equipment guide pin shank preload via shrink fitting is practically impossible to achieve since it was carried out by submersion of the pin shank into liquid nitrogen. Third, access to accommodate guide pin nut removal is difficult since the nut is recessed in the top side of the upper core plate. Fourth, extensive tooling design and development is necessary to qualify tooling and repair procedures.

Consequently, there is a need for improvements in the design of the guide pins for avoiding the abovedescribed drawbacks.

SUMMARY OF THE INVENTION

The present invention provides a top nozzle-mounted replacement guide pin assemblies designed to satisfy the aforementioned needs. The replacement guide pin assembly of the present invention emulates the alignment and function of the original equipment guide pin while minimizing the amount of repair performed on the reactor internals upper core plate. Since the replacement guide pin assembly of the present invention is installed in the fuel assembly top nozzle, the design, tooling, financial and scheduling concerns associated with installing replacement guide pin assemblies in the upper core plate are alleviated.

Accordingly, the present invention is directed to a guide pin assembly for aligning a nuclear fuel assembly with an upper core plate of a nuclear reactor core. The guide pin assembly comprises: (a) an elongated guide pin body having a base portion being insertable within a hole in the top nozzle, the guide pin body having a longitudinal axis; (b) an expandable body insertable within the top nozzle hole with the base portion of the guide pin body and capable of expanding radially outwardly relative to the longitudinal axis of the guide pin body to provide an interference fit with the top nozzle; and (c) means insertable within the top nozzle hole with the expandable body and the base portion of the guide pin body for threading with the base portion of the guide pin body to produce a predetermined displacement of the threading means relative to the guide pin body along the longitudinal axis thereof sufficient to impart a radially and outwardly directed force on the expandable body to produce expanding thereof within the hole of the top nozzle into the interference fit with the top nozzle and thereby secure the guide pin body to the top nozzle.

More particularly, two embodiments of the guide pin assembly are disclosed being mountable to the top nozzle of the nuclear fuel assembly.

The first embodiment of the guide pin assembly comprises: (a) an elongated guide pin body having a longitudinal axis, the guide pin body also having a lower expandable base being insertable within a hole in the top nozzle and capable of expanding radially outwardly relative to the longitudinal axis to provide an interference fit with the top nozzle; (b) means insertable within the hole in the top nozzle and interfitted with the guide pin body for imparting a radially and outwardly directed force on the lower expandable base to expand the base within the hole of the top nozzle into the interference fit with the top nozzle and thereby secure the guide pin body to the top nozzle in response to a predetermined displacement of the imparting means relative to the guide pin body along the longitudinal axis thereof; and (c) means insertable within the hole in the top nozzle and interfitted with the imparting means and the guide pin body for threading into the guide pin body to cause the predetermined displacement of the imparting means.

The second embodiment of the guide pin assembly comprises: (a) an elongated guide pin body having a lower attachment base being insertable within a hole in the top nozzle, the guide pin body having a longitudinal axis; (b) an expandable insert insertable within the hole in the top nozzle and interfitted about the lower attachment base of the guide pin body and capable of expanding radially outwardly relative to the longitudinal axis of the guide pin body to provide an interference fit with the top nozzle; and (c) means insertable within the hole in the top nozzle and interfitted with the guide pin body and the expandable insert for threading with the lower attachment base of the guide pin body to produce a predetermined displacement of the threading means relative to the guide pin body along the longitudinal axis thereof sufficient to impart a radially and outwardly directed force on the expandable insert to produce expanding thereof within the hole of the top nozzle into the interference fit with the top nozzle and thereby secure the guide pin body to the top nozzle.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is an enlarged fragmentary cross-sectional view of the upper core plate and an enlarged side elevational view of the first embodiment of the prior art guide pin being mounted to the upper core plate.

FIG. 5 is a side elevational view of the guide pin of FIG. 4 removed from the upper core plate.

FIG. 6 is a top plan view of an attachment nut used to mount the prior art guide pin of FIG. 4 to the upper core plate.

FIG. 7 is a cross-sectional view of the attachment nut taken along line 7—7 of FIG. 6.

FIG. 8 is a view similar to that of FIG. 3, but illustrating a second embodiment of a prior art guide pin being mounted to the top nozzle of the fuel assembly.

FIG. 9 is a side elevational view of the prior art guide pin of FIG. 8 removed from the top nozzle.

FIG. 10 is a cross-sectional view of the prior art guide pin taken along line 10—10 of FIG. 9.

FIG. 11 is an exploded side elevational, partly sectional, view of a first embodiment of a guide pin assembly of the present invention for mounting to the top nozzle of a fuel assembly.

FIG. 21 is a view similar to that of FIG. 14, but on an enlarged scale and illustrating a passageway drilled transversely through the guide pin body in offset relation to a longitudinal axis of the guide pin body.

FIG. 22 is a cross-sectional view of the guide pin body taken along line 22—22 of FIG. 21.

FIG. 23 is a side elevational view of a lock pin of the guide pin assembly that inserts into the passageway through the guide pin body.

FIG. 26 is a fragmentary sectional view of the top nozzle and guide pin assembly illustrating the guide pin assembly before insertion into one of the corner holes in the upper annular flange of the top nozzle.

FIG. 27 is a view similar to that of FIG. 26, but illustrating the guide pin assembly after insertion in the corner hole in the upper annular flange of the top nozzle, but before, crimping of a lower peripheral edge of the guide pin body with the lock screw.

FIG. 28 is a view similar to that of FIG. 27, but illustrating the guide pin assembly after crimping of the lower peripheral edge of the guide pin body with the lock screw.

FIG. 29 is an enlarged bottom plan view of the lower peripheral edge of the guide pin body crimped with the lock screw.

FIG. 31 is a side elevational view of a guide pin body of the guide pin assembly of FIG. 30.

FIG. 32 is a cross-sectional view of the guide pin body taken along line 32—32 of FIG. 31.

FIG. 33 is an enlarged exploded side elevational view of an expandable insert, ferrule and end cap of the guide pin assembly of FIG. 30.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
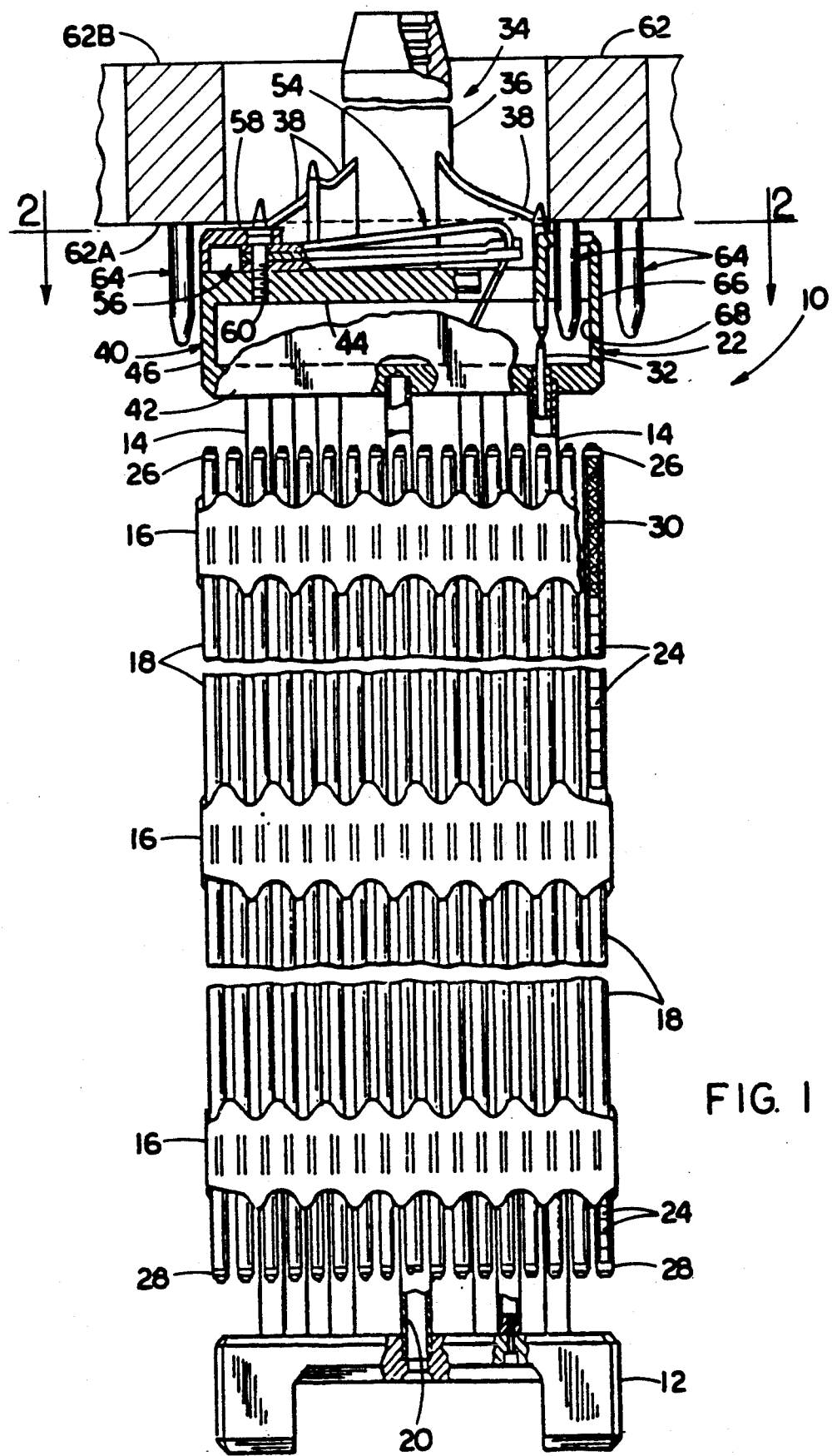
FIG. 1 is a side elevational view, with parts partially sectioned, foreshortened, and broken away for purposes of clarity, of a prior art nuclear fuel assembly being disposed below and aligned with a top core plate of a nuclear reactor core by a first embodiment of prior art guide pins mounted to the top core plate.

Referring now to the drawings, and particularly to FIG. 1, there is shown a prior art nuclear fuel assembly, generally designated 10. Being the type use in a pressurized water nuclear reactor (PWR), the prior art fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26, 28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally grooved cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Figure 2:
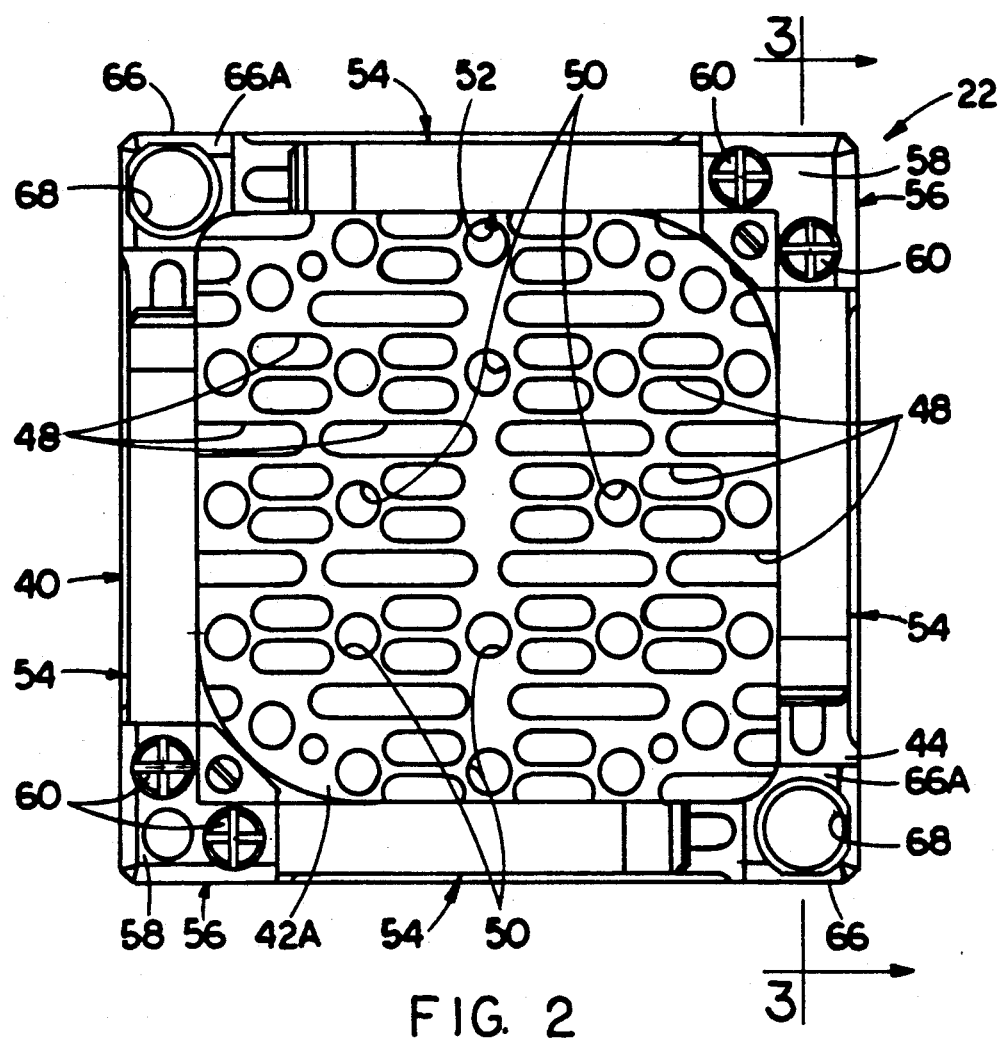
FIG. 2 is an enlarged top plan view of the prior art top nozzle removed from the prior art fuel assembly of FIG. 1.
Figure 3:
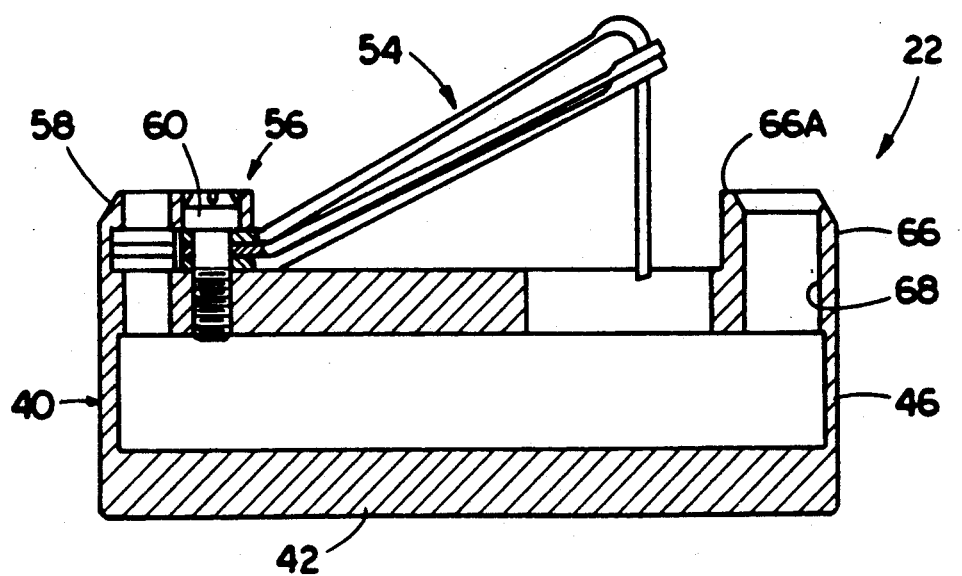
FIG. 3 is a sectional view of the prior art top nozzle taken along line 3—3 of FIG. 2.
Figure 12:
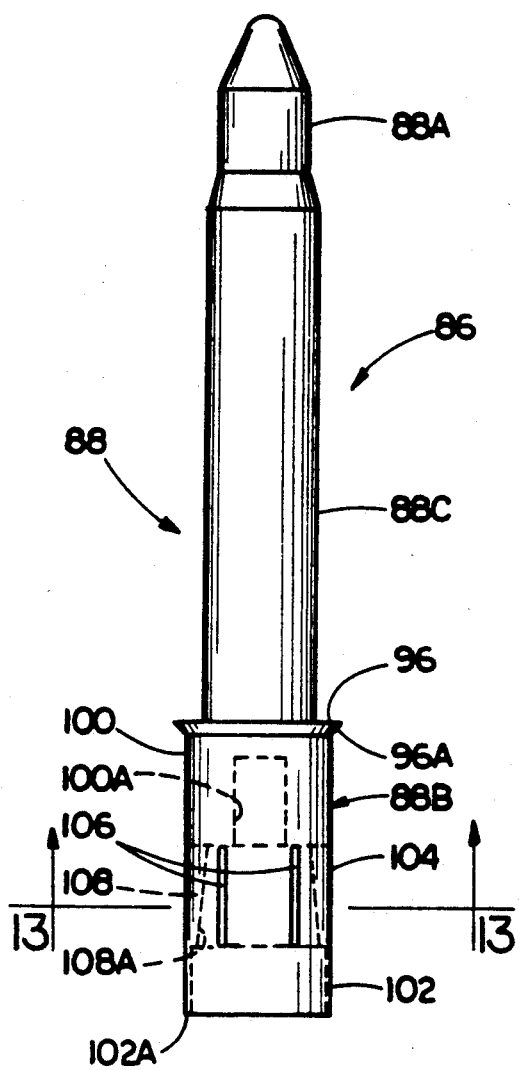
FIG. 12 is an enlarged side elevational view of a guide pin body of the guide pin assembly of FIG. 11.
Figure 14:
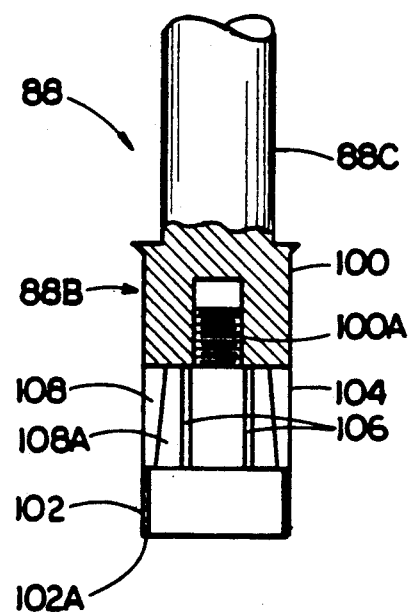
FIG. 14 is a fragmentary side elevational, partly sectional, view of the guide pin body of FIG. 12.
Figure 13:
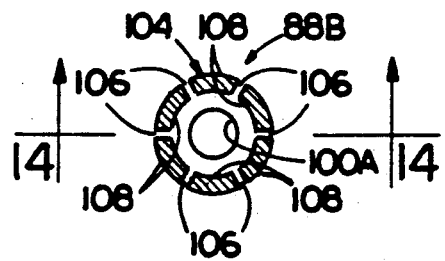
FIG. 13 is a cross-sectional view of the guide pin body taken along line 13—13 of FIG. 12.
Figure 16:
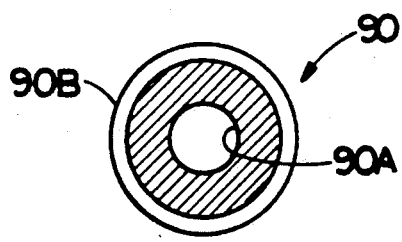
FIG. 16 is a cross-sectional view of the ferrule taken along line 16—16 of FIG. 15.
Figure 15:
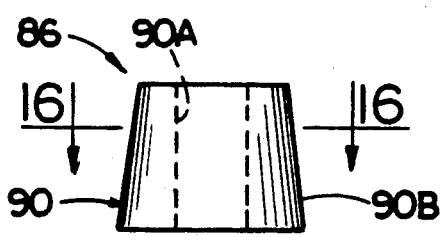
FIG. 15 is an enlarged side elevational view of a ferrule of the guide pin assembly of FIG. 11.
Figure 17:
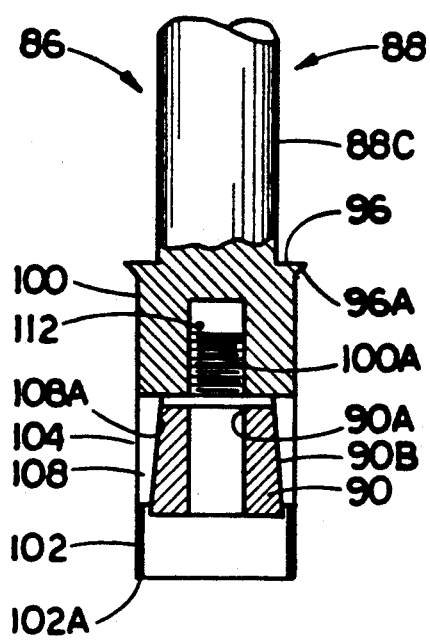
FIG. 17 is a view similar to that of FIG. 14, but showing the guide pin body with the ferrule inserted therein.
Figure 18:
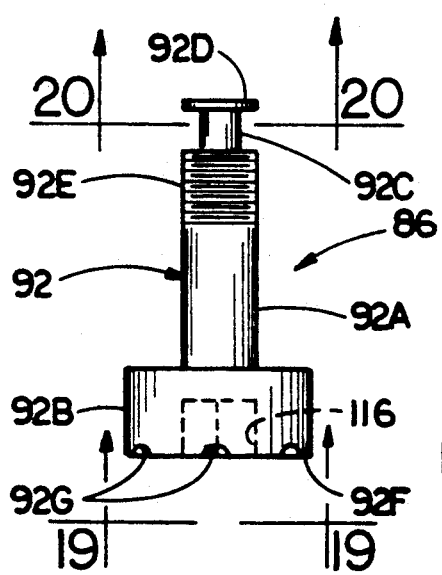
FIG. 18 is a side elevational view of a lock screw of the guide pin assembly of FIG. 11.
Figure 19:
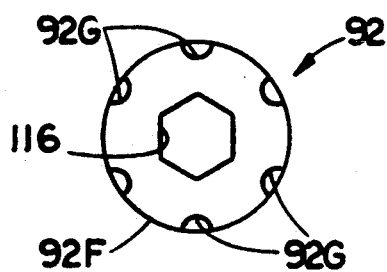
FIG. 19 is a bottom plan view of the lock screw as seen along line 19—19 of FIG. 18.
Figure 20:
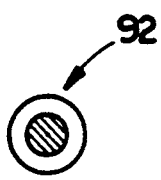
FIG. 20 is a cross-sectional view of the lock screw taken along line 20—20 of FIG. 18.
Figure 25:
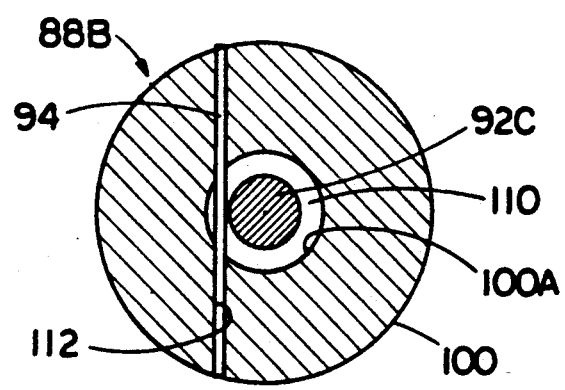
FIG. 25 is a cross-sectional view of the guide pin assembly taken along line 25—25 of FIG. 24.
Figure 24:
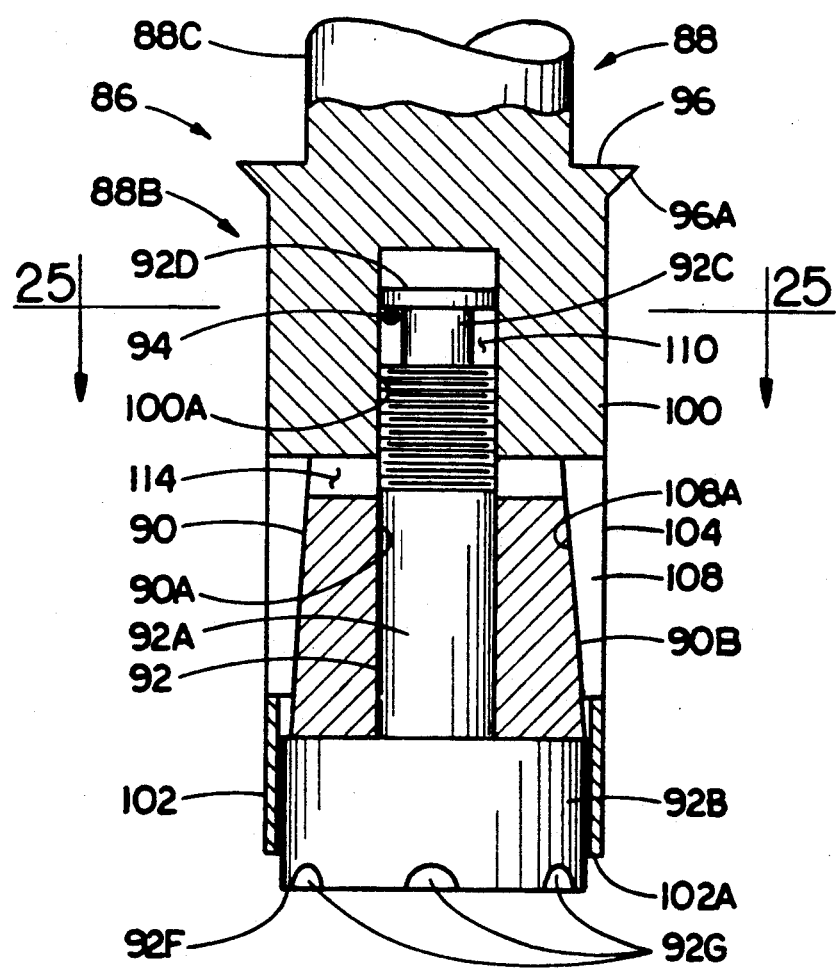
FIG. 24 is a view similar to that of FIG. 21, but illustrating the guide pin body, ferrule, lock screw and lock pin assembled together so as to provide the guide pin assembly in a preinstalled condition.

Referring now to FIGS. 2 and 3 as well as FIG. 1, it can be seen that the art top nozzle 22 of the prior art fuel assembly 10 includes an enclosure or housing 40 formed by a transversely extending lower adapter plate 42 and an upper annular flange 44 with an upstanding sidewall 46 extending between and integrally interconnecting the adapter plate 42 and flange 44 at their respective peripheries. The lower adapter plate 42 has a main central portion 42A provided with a first plurality of holes 48 to permit the flow of coolant upward through the top nozzle 22 and a second plurality of holes 50 to receive the upper ends of the guide thimbles 14 and where they are attached to the lower adapter plate 42. The upper annular flange 44 defines a central top opening 52 in the top nozzle 22 through which is disposed the rod cluster control assembly 34 being operable to insert and withdraw the control rods 32 into and from the guide thimbles 14 of the fuel assembly 10 through the second plurality of lower adapter plate holes 50.

Also, a plurality of spring assemblies 54 are suitably clamped to the upper annular flange 44 to constitute a hold-down device for the fuel assembly 10. Each spring assembly 54 is composed of a set of leaf springs 54A disposed in a stack relation, and fastened in operative position on the top nozzle upper flange 44 at each of one pair of opposite diagonal corners 22A of the top nozzle 22 by using a spring clamp 56 which includes a corner block 58 and a spring screw 60. The spring assemblies 54 cooperate in a conventional manner with an upper core plate 62 of the reactor core located above the fuel assembly 10 to prevent hydraulic lifting of the fuel assembly 10 caused by upward coolant flow while allowing for changes in fuel assembly length due to core induced thermal expansion and the like.

Prior Art Guide Pins

Referring to FIGS. 1 and 4–7, there is illustrated a first embodiment of a guide pin of the prior art, generally designated 64, mounted from the upper core plate 62. The other pair of diagonal corners 22B of the top nozzle 22 of FIGS. 2 and 3 have upwardly projecting abutments 66 formed on the upper annular flange 44 and defining holes 68 which mate with the prior art guide pins 64 mounted in and projecting below the upper core plate 62. The guide pins 64 disposed between the upper core plate 62 and top nozzle 22 of each fuel assembly 10 provide proper alignment and engagement of the fuel assembly 10 with the upper core plate 62 so that the guide thimbles 14 of the fuel assembly 10 will extend vertically in alignment with the control rods 32 for receiving the control rods 32 from above.

Referring to FIGS. 4–7, the first embodiment of the prior art guide pin 64 has a generally circular crosssection, and includes an elongated lower body portion 64A with a conical or bullet-shaped lower end nose 64B, a threaded upper end portion 64C, and an upper shaft portion 64D of reduced diameter which interconnects the lower body portion 64A and the threaded upper end portion 64C. The upper shaft portion 64D has a smaller diameter than the lower body portion 64A so as to facilitate a tight fitting (shrink fit) relation with the upper core plate 62 through a bore 70 in the upper core plate 62, with an upwardly-facing annular shoulder 64E defined on the upper end of the lower body portion 64A abutting against a lower surface 62A of the upper core plate 62 about the bore 70.

Also, the upper core plate 62 has a recess 72 defined in an upper surface 62B which receives an attachment nut 74. The nut 74 has an internally-threaded central hole 76 by which it is threaded onto the threaded upper end portion 64C of the guide pin 64. The attachment nut 74 also has a pair of pilot holes 78 offset from opposite sides of the central hole 76 which mate with alignment pins on a tool (not shown) used in threading the nut 74 on the upper end portion 64C of the guide pin 64. To install the guide pin 64, the nut 74 is tightened relative to the bottom of the upper core plate recess 72 to thereby clamp the upper core plate 62 between the nut 74 and the shoulder 64E on the lower body portion 64A of the guide pin 64. After installation, the attachment nut 74 is permanently attached, such as by tack welding, to the upper core plate 62.

Referring to FIGS. 8-10, there is illustrated a second embodiment of a guide pin of the prior art, generally designated 80, mounted from the top nozzle 22. The second embodiment of the prior art guide pin 80 has a generally circular cross-section, and includes an elongated upper body portion 80A with a conical or bullet-shaped upper end nose 80B, a threaded lower end portion 80C, and a lower shaft portion 80D of reduced diameter which interconnects the upper body portion 80A and the threaded lower end portion 80C. The lower shaft portion 80D has a smaller diameter than the upper body portion 80A so as to facilitate installation of the guide pin 80 in the hole 68 of one of the top nozzle corner raised abutments 66. At its end, the upper body portion 80A an enlarged diameter collar 80E integrally formed thereabout which rests on the top surface 66A of the abutment 66 extending about the hole 68 therein. The threaded lower end portion 80C of the guide pin 80 is threaded into the internally threaded abutment hole 68 and thereafter a lock pin 82 is driven into a hole 84 drilled radially through the abutment 66 and into the lower shaft portion 80D, as seen in FIG. 8.

From the above descriptions, it will be understood that the first and second embodiments of the prior art guide pins 64, 80 are intended to be permanently attached the respective upper core plate 62 and top nozzle 22.

Guide Pin Assemblies of the Invention

Turning now to FIGS. 11-29, there is illustrated a first embodiment of a replacement (and removable) guide pin assembly in accordance with the present invention, being generally designated 86, for installation in one of the corner abutment holes 68 of the top nozzle 22. The first embodiment of the replacement guide pin assembly 86 includes an elongated guide pin body 88, a ferrule 90, a lock screw 92, and a lock pin 94.

Referring to FIGS. 11-14, the guide pin body 88 of the replacement guide pin assembly 86 has a bullet-shaped upper end nose 88A, a lower expandable base 88B, and an elongated middle cylindrical shaft portion 88C of generally uniform or constant diameter extending between and integrally connected with the upper end nose 88A and lower expansion base 88B. The bullet-shaped nose 88A facilitates insertion of the middle shaft portion 88C of the guide pin body 88 into the bore 70 of the upper core plate 62 which is the same bore used in case of the prior art guide pins. The middle cylindrical shaft portion 88C of the guide pin body 88 will extend within the bore 70 and thereby interface with the upper core plate 62. An annular flange 96 is formed on the guide pin body 88 at the juncture of the lower expansion base 88B and the middle shaft portion 88C thereof. The annular flange 96 projects radially outwardly from the guide pin body 88 and has a downwardly-facing, outwardly and upwardly inclined, shoulder 96A which seats on a complementarily-shaped internal annular surface 98 defined in the top surface 66A of the top nozzle abutment 66 surrounding the upper end of the abutment hole 68. The surface 98 provides a reference elevation for the guide pin assembly 86.

The lower expandable base 88B of the guide pin body 88 has an upper cylindrical base portion 100, a lower cylindrical thin-walled skirt portion 102, and a middle expandable wall portion 104, which portions extend within the top nozzle abutment bore 68, thereby interfacing with the top nozzle 22. The upper base portion 100 of the lower expandable base 88B has a central internally-threaded bore 100A. The middle expandable wall portion 104 has a plurality of circumferentially spaced vertical slots 106 defining between them a plurality of flexible wall segments 108 extending between and interconnecting the upper base portion 100 and the lower skirt portion 102. The interior surfaces 108A of the wall segments 108 are inclined upwardly and inwardly with respect to a longitudinal axis A of the guide pin body 88.

Referring to FIGS. 11-20, the ferrule 90 and lock screw 92 of the replacement guide pin assembly 86 interfit within the lower expandable base 88B of the guide pin body 88. The ferrule 90 has a central opening 90A and a frusto-conical exterior configuration defining an exterior surface 90B inclined upwardly and inwardly relative to the longitudinal axis A of the guide pin body 88. The exterior surface 90B of the ferrule 90 is thus complementary to and interfaced with the interior surfaces 108A of the wall segments 108 of the lower expandable base 88B. The ferrule 90 is installed into the interior of the lower expandable base 88B of the guide pin body 88 from its lower end and upwardly along the longitudinal axis A of the guide pin body 88. The ferrule 90 thus interfits with the lower expandable base 88B of the guide pin body 88 and is capable of imparting a radially and outwardly directed force on the lower expandable base 88B to expand of the base within the hole 68 of the top nozzle 22 and thereby to secure the guide pin body 88 to the top nozzle 22 in response to a predetermined displacement of the ferrule 90 relative to the guide pin body 88 along its longitudinal axis A.

The lock screw 92 has cylindrical shank 92A and head 92B integrally attached to the lower end of the shank 92A. The upper portion of the shank 92A has a reduced diameter (or relief) section 92C (compared to the rest of the shank) which defines an annular stop 92D on the top end of the shank 92A. The shank 92A and stop 92D fit upwardly through the central opening 90A of the ferrule 90 (once the latter has already been installed in the lower expandable base 88B) and into the internally-threaded bore 100A in the upper base portion 100 of the lower expandable base 88B. A portion 92E of the shank 92A immediately below the reduced diameter section 92C is externally-threaded to allow threading of the lock screw 92 into the guide pin body 88. The lock screw 92 thus provides a means which interfits with the ferrule 90 and threads into the guide pin body 88 to produce the required predetermined displacement of the ferrule 90 to cause expanding of the lower expandable base 88B.

Referring to FIGS. 21-25, the purpose of the reduced diameter section 92C on the shank 92A, which defines an annular cavity 110 between the shank 92A and the upper base portion 100, is to accommodate the presence of the lock pin 94 in order to hold the guide pin body 88, ferrule 90, and lock screw 92 together as a unit before installation in the abutment hole 68 in the top nozzle 22. The lock pin 94 will thus preclude the lock screw 92 from being unthreaded and withdrawn inadvertently from the guide pin body 88 which would result in the ferrule 90 and lock screw 92 becoming loose parts. The lock pin 94 is forced into a hole 112 predrilled through the upper base portion 100 of the lower expandable base 88B of the guide pin body 88. The hole 112 is predrilled generally perpendicular to and offset from the longitudinal axis A of the guide pin body 88 so as not to intersect with the reduced diameter section 92C on the shank 92A and instead intersect with the annular cavity 110. Thus, the lock pin 94 when installed through the hole 112 will underlie the annular stop 92D on the top end of the shank 92A so as to prevent removal of the lock screw 92 without first removing the lock pin 94.

Referring to FIGS. 26–29, there is illustrated the first embodiment of the replacement guide pin assembly 86 of the present invention at successive stages of the procedure for installing the guide pin assembly 86 in the top nozzle 22. FIG. 26 shows guide pin assembly 86 before insertion into one of the corner abutment holes 68 of the top nozzle 22. It will be observed that the lock pin 94 has been installed so as to hold the guide pin body 88, ferrule 90, and lock screw 92 together as a unit.

FIG. 27 depicts the guide pin assembly 86 after insertion in the corner abutment hole 68 of the top nozzle 22, but before final torquing or tightening of the lock screw 92 into the guide pin body 88 and crimping of a lower peripheral edge 102A of the lower skirt portion 102 of the lower expandable base 88B under the outer peripheral edge 92F of the lower head 92B of the lock screw 92. It will be noted that a small gap 114 exists between the top of the ferrule 90 and the upper base portion 100 of the lower expandable base 88B of the guide pin body 88. The width of this gap 114 represents the amount of predetermined displacement that the ferrule 90 must undergo in order to impart the required radially and outwardly directed force to expand the lower expandable base 88B the desired amount to secure the guide pin body 88 in the top nozzle hole 68.

FIGS. 28 and 29 show the guide pin assembly 86 after torquing of the lock screw 92 completely into the guide pin body 88 and crimping of the lower peripheral edge 102A of the lower skirt portion 102 of the lower expandable base 88B under the outer peripheral edge 92F of the lock screw lower head 92B. To torque the lock screw 92, a socket 116 for receiving an appropriate tool (not shown) is provided in the lower surface of the head 92B. During threading and torquing of the lock screw 92 into the guide pin body 88, the ferrule 90 is displaced the desired predetermined amount along the longitudinal axis A of the guide pin body 88 such that the forementioned gap 114 between the ferrule 90 and guide pin body 88 becomes closed. The purpose of the gap 114 is to provide a predetermined interference fit between the guide pin assembly 86 and the top nozzle 22. As the gap 114 becomes closed by the upward displacement of the ferrule 90, the sliding contact between the complementary inclined surfaces 108A, 90B of the wall segments 108 and the ferrule 90 imparts a radially and outwardly directed force on the slotted flexible wall segments 108 of the middle expandable wall portion 104 of the lower expandable base 88B sufficient to cause them to expand outwardly into engagement with the interior surface of the abutment opening 68 in the top nozzle 22. In such manner the replacement guide pin assembly 86 is secured by an interference fit to the top nozzle 22.

As seen in FIG. 29, the lock screw head 92B has a plurality of hemispherical-shaped relief pockets 92G formed in spaced circumferential relation from one another about the peripheral edge 92F of the head 92B. The lower peripheral edge 102A is crimped into the more readily accessible ones of relief pockets 92G. The function of the relief pockets 92G and the crimping of the skirt edge 102A into some of them is to prevent loosening of the lock screw 92 during normal service. Should it be desirable to remove the guide pin assembly 86, a reverse torque can be applied by the socket tool to overpower the skirt crimp and loosen the lock screw 92.

Referring to FIGS. 30–39, there is illustrate a second embodiment of a replacement (and removable) guide pin assembly in accordance with the present invention, being generally designated 118, for installation in one of the corner abutment holes 68 of the top nozzle 22. The second embodiment of the replacement guide pin assembly 118 includes an elongated guide pin body 120, an expandable insert 122, a ferrule 124, and an end cap 124.

Figure 30:
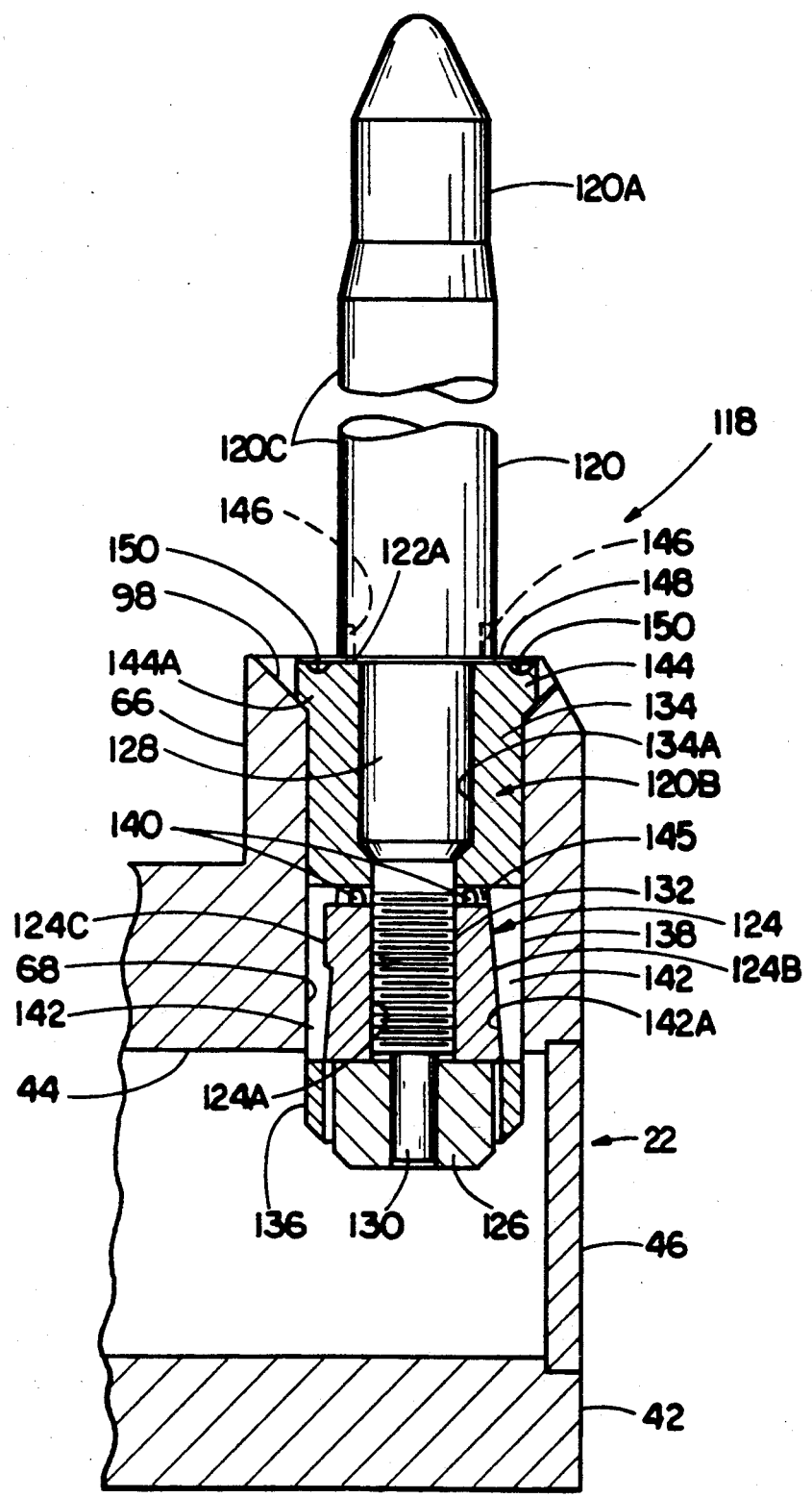
FIG. 30 is a fragmentary cross-sectional view of the top nozzle and a side elevational, partly sectional, view of a second embodiment of a guide pin assembly of the present invention mounted to the top nozzle.
Figure 34:
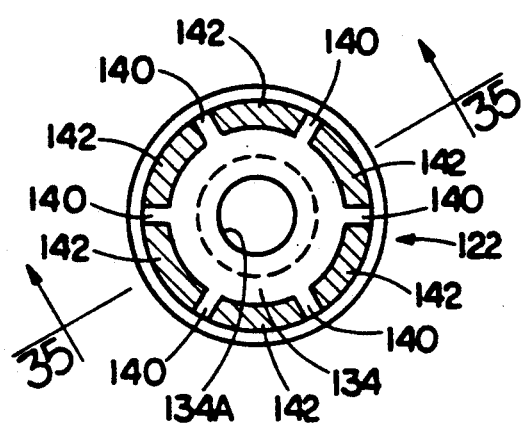
FIG. 34 is a cross-sectional view of the expandable insert taken along line 34—34 of FIG. 33.
Figure 35:
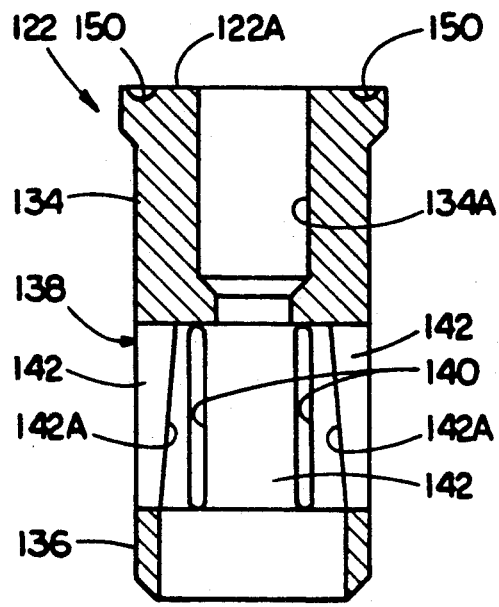
FIG. 35 is a longitudinal sectional view of the expandable insert taken along line 35—35 of FIG. 34.
Figure 36:
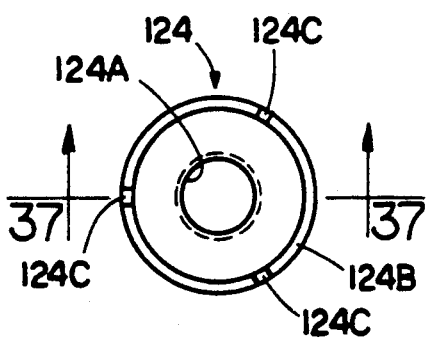
FIG. 36 is a top plan view of the ferrule as seen along line 36—36 of FIG. 33.
Figure 37:
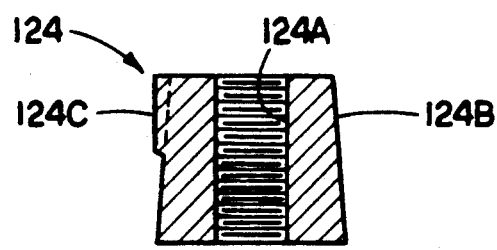
FIG. 37 is a longitudinal sectional view of the ferrule taken along line 37—37 of FIG. 36.
Figure 38:
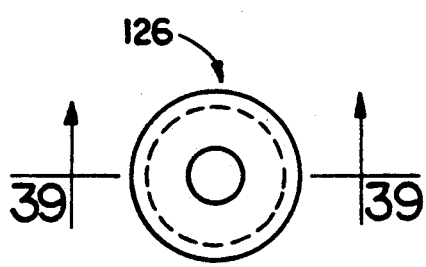
FIG. 38 is a top plan view of the end cap as seen along line 38—38 of FIG. 33.
Figure 39:
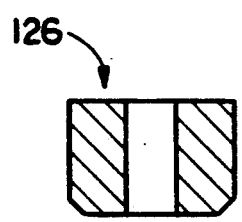
FIG. 39 is a longitudinal sectional view of the end cap taken along line 39—39 of FIG. 38.

Referring to FIGS. 30–32, the guide pin body 120 of the replacement guide pin assembly 118 has a bullet-shaped upper end nose 120A, a lower attachment base 120B, and an elongated middle cylindrical shaft portion 120C of generally uniform or constant diameter extending between and integrally connected with the upper end nose 120A and lower attachment base 120B. The bullet-shaped nose 120A facilitates insertion of the middle shaft portion 120C of the guide pin body 120 into the bore 70 of the upper core plate 62 which is the same bore used in case of the prior art guide pins. The middle shaft portion 120C of the guide pin body 120 extends within the bore 70, thereby interfacing with the upper core plate 62. The lower attachment base 120B has upper and lower cylindrical mounting sections 128, 130 and a middle mounting section 132 being externally threaded to threadably receive the ferrule 124 as described below. The upper, middle and lower mounting sections 128, 132, 130 are of reduced diameters relative to the middle shaft portion 120C and relative to one another in that order.

Referring to FIGS. 30 and 33-35, the expandable insert 122 of the guide pin assembly 118 has an upper cylindrical base portion 134, a lower cylindrical skirt portion 136, and a middle expandable wall portion 138, which portions extend through the top nozzle abutment bore 68 and thereby interface with the top nozzle 22. The expandable insert 122 inserts within the top nozzle hole 68, interfits about the lower attachment base 120B of the guide pin body 120, and is capable of expanding radially outwardly relative to the longitudinal axis A of the guide pin body 120 to provide an interference fit with the top nozzle 22.

The upper base portion 134 has a central bore 134A which receives the upper mounting section 128 of the lower attachment base 120A of the guide pin body 120. The middle expandable wall portion 138 has a plurality of circumferentially spaced vertical slots 140 defining between them a plurality of flexible wall segments 142 extending between and interconnecting the upper base portion 134 and the lower skirt portion 136. The interior surfaces 142A of the wall segments 142 are inclined upwardly and inwardly with respect to a longitudinal axis B of the guide pin body 120.

An annular flange 144 is formed about the upper peripheral edge of the upper base portion 134 of the expandable insert 122. The annular flange 144 projects radially outwardly from the expandable insert upper base portion 134 and has a downwardly-facing, outwardly and upwardly inclined, shoulder 144A which seats on the complementarily-shaped internal annular surface 98 defined in the top surface 66A of the top nozzle abutment 66 surrounding the upper end of the abutment hole 68. As before, the surface 98 provides a reference elevation for the guide pin assembly 118.

Referring to FIGS. 30, 33 and 36–39, the ferrule 124 and end cap 126 of the replacement guide pin assembly 118 fit within the middle wall portion 138 and lower skirt portion 136 of the expandable insert 122 and fit on the middle threaded section 132 and lower section 128 of the lower attachment base 120B of the guide pin body 120. The ferrule 124 has a central opening 124A that is internally-threaded for threading of the ferrule 124 onto the externally-threaded middle section 132 of the lower attachment base 120B of the guide pin body 120. The ferrule 124 also has a frusto-conical exterior configuration defining an exterior surface 124B inclined upwardly and inwardly relative to the longitudinal axis B of the guide pin body 120. The exterior surface 124B of the ferrule 124 is thus complementary to and interfaced with the interior surfaces 142A of the wall segments 142 of the expandable insert 122.

The ferrule 124 is installed into the interior of the expandable insert 122 from its lower end and upwardly along the longitudinal axis B of the guide pin body 120. The ferrule 124 interfits with the expandable insert 122 and threads over the middle shaft portion 120C of the guide pin body 120. The ferrule 124, as it is threaded through a predetermined displacement along the longitudinal axis B of the guide pin body 120 toward the upper base portion 134 of the expandable insert 122, will impart a radially and outwardly directed force on the middle expandable wall portion 138 of the expandable insert 122 to expand it within the hole 68 into an interference fit with the top nozzle 22 and thereby to secure the guide pin body 120 to the top nozzle 22. Thus, it is the threading of the ferrule 124 itself on the lower attachment base 120B of the guide pin body 120 which produces the required predetermined displacement of the ferrule 90 to cause expanding of the expandable insert 122.

In addition, the ferrule 124 has a plurality of radially outward projecting tabs 124C formed on the exterior surface 124B of the ferrule which are spaced circumferentially from one another. The tabs 124C project into the slots 140 in the expandable middle wall portion 138 of the expandable insert 122 so as to prevent rotation of the ferrule 124 relative thereto as the guide pin body 120 is threaded and torqued into the ferrule 124.

The end cap 126 inserts over the lower section 130 of the lower attachment base 120B of the guide pin body 120. The end cap 126 is then attached thereto, such as by tack welding, to preclude disassembly of the basic parts of the guide pin assembly 118 from one another.

As in the case of the first embodiment, it will be noted that prior to torquing of the guide pin body 120 to the ferrule 124, a small gap 145 (see FIG. 30) exists between the top of the ferrule 124 and the upper base portion 134 of the expandable insert 122. During torquing, the aforementioned gap 145 between them. The width of this gap 145 becomes closed represents the amount of predetermined displacement that the ferrule 124 must undergo in order to impart the required radially and outwardly directed force to expand the expandable insert 122 the desired amount to secure the guide pin body 120 in the top nozzle hole 68. During threading and torquing of the ferrule 124 onto the lower attachment base 120B of the guide pin body 120, the ferrule 124 is displaced the desired predetermined amount along the longitudinal axis B of the guide pin body 120 such that the foreementioned gap 145 between the ferrule 124 and expandable insert 122 becomes closed. The purpose of the gap 145 is to provide a predetermined interference fit between the guide pin assembly 118 and the top nozzle 22. As the gap 145 becomes closed by the upward displacement of the ferrule 124, the sliding contact between the complementary inclined surfaces 142A, 124B of the wall segments 142 and the ferrule 124 imparts a radially and outwardly directed force on the slotted flexible wall segments 142 of the middle expandable wall portion 138 of the expandable insert 122 sufficient to cause them to expand outwardly into engagement with the interior surface of the abutment opening 68 in the top nozzle 22. In such manner the replacement guide pin assembly 118 is secured by an interference fit to the top nozzle 22.

Referring to FIGS. 30–32, in order to torque the guide pin body 120 relative to the ferrule 124, the guide pin body 120 has a plurality of torque grooves 146 near the base of its middle shaft portion 120C to accommodate suitable installation tooling (not shown). During torquing of the guide pin body 120, the ferrule 124, in addition to causing expansion of the wall segments 142 into engagement with the top nozzle 22, also acts like a "nut" since it does not rotate due to the presence of the anti-rotation tabs 124C. Also, a locking ring or disc 148 is attached to the guide pin body 120 at the juncture of the middle shaft portion 120C and the lower attachment base 120B. To preclude inadvertent loosening of the parts of the guide pin assembly 118 during reactor operation, the locking ring 148 is crimped locally (at two or three locations) into hemispherical relief pockets 150 provided in the top surface 122A of the expansion insert 122.

The guide pin assemblies 86,118, being designed to preclude loose parts, can be installed remotely underwater on irradiated top nozzles. However, because of the evolution of fuel assembly design, most reactors are now operating with cores having fuel assemblies with both welded and removable top nozzles. Should a reactor experience damaged guide pins at a fuel assembly with a removable top nozzle, the irradiated nozzle could be removed and replaced with a top nozzle having these replacement guide pin assemblies 86, 118. Installation of the replacement guide pin assemblies 86, 118 in the new top nozzle could be accomplished in either the factory or field. Equipment and procedures used for fuel assembly top nozzle reconstitution can be readily applied for this repair.

To accommodate the replacement guide pin assemblies 86, 118 removal of the damaged guide pin (in its entirety) from the reactor internals upper core plate is necessary. Removal of the guide pin can be readily accomplished by machining out the center of the shank (by either conventional or EDM techniques). Machining out the center of the shank will diminish the preload contact stress and facilitate removal of the damaged guide pin. The design of the replacement guide pin body can be specified to maintain fuel assembly top nozzle/upper internals alignment equivalent to that of the original equipment.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A guide pin assembly for aligning a nuclear fuel assembly with an upper core plate of a nuclear reactor core, said guide pin assembly comprising:
   (a) an elongated guide pin body having a base portion being insertable within a hole in the top nozzle, said guide pin body having a longitudinal axis;
   (b) an expandable body insertable within the top nozzle hole with said base portion of said guide pin body, said expandable body having a wall portion including a plurality of circumferentially spaced vertical slots defining between them a plurality of flexible wall segments being capable of expanding radially outwardly relative to said longitudinal axis of said guide pin body to provide an interference fit with the top nozzle; and
   (c) means insertable within the top nozzle hole with said expandable body and said base portion of said guide pin body for threading with said base portion of said guide pin body to produce a predetermined displacement of said threading means relative to said guide pin body along said longitudinal axis thereof sufficient to impart a radially and outwardly directed force on said flexible wall segments of said wall portion of said expandable body to produce expanding thereof within the hole of the top nozzle into said interference fit with the top nozzle and thereby secure said guide pin body to the top nozzle.

2. The guide pin assembly as recited in claim 1, wherein said expandable body is formed integrally with said base portion of said guide pin body.

3. The guide pin assembly as recited in claim 1, wherein said expandable body is removably insertable about said base portion of said guide pin body.

4. A guide pin assembly mountable to a top nozzle of a nuclear fuel assembly for aligning the fuel assembly with an upper core plate of a nuclear reactor core, said guide pin assembly comprising:
   (a) an elongated guide pin body having a longitudinal axis, said guide pin body also having a lower expandable base being insertable within a hole i the top nozzle, said lower expandable base including an upper cylindrical base portion, a middle expandable wall portion, and a lower cylindrical skirt portion, said middle expandable wall portion of said lower expandable base having a plurality of circumferentially spaced vertical slots defining between them a plurality of flexible wall segments extending between and interconnecting said upper base portion and said lower skirt portion, said flexible wall segments of said middle expandable wall portion being capable of expanding radially outwardly relative to said longitudinal axis to provide an interference fit with the top nozzle;
   (b) means insertable within the hole in the top nozzle and interfitted with said guide pin body for imparting a radially and outwardly directed force on said flexible wall segments of said middle expandable wall portion of said lower expandable base to expand said flexible wall segments of said base within the hole of the top nozzle into said interference fit with the top nozzle and thereby secure said guide pin body to the top nozzle in response to a predetermined displacement of said imparting means relative to said guide pin body along said longitudinal axis thereof; and
   (c) means insertable within the hole in the top nozzle and interfitted with said imparting means and said guide pin body for threading with said guide pin body to produce said predetermined displacement of said imparting means.

5. The guide pin assembly as recited in claim 4, wherein said guide pin body also has an upper end nose and an elongated middle cylindrical shaft portion of generally uniform or constant diameter extending between and integrally connected with said upper end nose and said lower expandable base, said upper end nose and middle shaft portion projecting above the hole in the top nozzle.

6. The guide pin assembly as recited in claim 5, wherein said guide pin body has an external annular flange formed thereon at the juncture of said lower expandable base and said middle shaft portion thereof, said annular flange projecting radially outwardly from said guide pin body and having a downwardly-facing, outwardly and upwardly inclined, shoulder adapted to seat on a complementarily-shaped internal annular surface surrounding the top nozzle hole.

7. The guide pin assembly as recited in claim 4, wherein said upper base portion of said lower expandable base of said guide pin body has a central internally-threaded bore.

8. The guide pin assembly as recited in claim 7, wherein said threading means has a shank with an upper externally-threaded portion adapted to thread within said internally-threaded bore of said lower expandable base of said guide pin body.

9. The guide pin assembly as recited in claim 8, wherein said threading means also has an annular stop on a top end of said shank and a reduced diameter section between said stop and said upper threaded portion of said shank, said reduced diameter section and stop adapted to fit upwardly into said threaded bore in said upper base portion of said lower expandable base of said guide pin body.

10. The guide pin assembly as recited in claim 9, further comprising:
    means defining a hole through said upper base portion of said lower expandable base of said guide pin body in transverse and offset relation to a longitudinal axis of said guide pin body; and
    a lock pin inserted into said hole in said guide pin body so as to extend past and not intersect with said reduced diameter section of said shank of said threading means and underlie said annular stop on said top end of said shank so as to prevent removal of said lock screw from said guide pin body without first removing said lock pin.

11. The guide pin assembly as recited in claim 4, wherein said wall segments of said middle expandable wall portion have respective interior surfaces being inclined upwardly and inwardly with respect to a longitudinal axis of said guide pin body.

12. The guide pin assembly as recited in claim 11, wherein said force-imparting means has an exterior surface inclined upwardly and inwardly relative to the longitudinal axis of said guide pin body and thus complementary to and interfaced with said interior surfaces of said wall segments of said lower expandable base.

13. The guide pin assembly as recited in claim 4, wherein said force-imparting means has a central opening.

14. The guide pin assembly as recited in claim 13, wherein said tightening means has a shank fitting upwardly through said central opening of said force-imparting means.

15. The guide pin assembly as recited in claim 14, wherein said force-imparting means has a lower head integrally attached to a lower end of said shank.

16. The guide pin assembly as recited in claim 15, wherein said lower skirt portion of said lower expandable base of said guide pin body has a lower peripheral edge crimped under an outer peripheral edge of said lower head of said force-imparting means.

17. The guide pin assembly as recited in claim 16, wherein said lower head of said force-imparting means has a plurality of relief pockets formed in spaced circumferential relation from one another about said peripheral edge of said head, said lower skirt portion being crimped into at least some of said relief pockets.

18. The guide pin assembly as recited in claim 16, wherein said lower expandable base of said guide pin body has a central internally-threaded bore.

19. The guide pin assembly as recited in claim 18, wherein said shank of said force-imparting means has an upper externally-threaded portion adapted to thread within said internally-threaded bore of said lower expandable base of said guide pin body.

20. The guide pin assembly as recited in claim 19, wherein said force-imparting means also has an annular stop on a top end of said shank and a reduced diameter section between said stop and said upper threaded portion of said shank, said reduced diameter section and stop adapted to fit upwardly into said threaded bore in said upper base portion of said lower expandable base of said guide pin body.

21. The guide pin assembly as recited in claim 20, further comprising:
   means defining a hole through said upper base portion of said lower expandable base of said guide pin body in transverse and offset relation to a longitudinal axis of said guide pin body; and
   a lock pin inserted into said hole in said guide pin body so as to extend past and not intersect with said reduced diameter section of said shank of said force-imparting means and underlie said annular stop on said top end of said shank so as to prevent removal of said force-imparting means from said guide pin body without first removing said lock pin.

22. A guide pin assembly for aligning a nuclear fuel assembly with an upper core plate of a nuclear reactor core, said guide pin assembly comprising:
   (a) an elongated guide pin body having a lower attachment base being insertable within a hole in the top nozzle, said guide pin body having a longitudinal axis;
   (b) an expandable insert insertable within the hole in the top nozzle and interfitted about said lower attachment base of said guide pin body, said expandable insert including an upper cylindrical base portion, a middle expandable wall portion, and a lower cylindrical skirt portion, said middle expandable wall portion of said expandable insert having a plurality of circumferentially spaced vertical slots defining between them a plurality of flexible wall segments extending between and interconnecting said upper base portion and said lower skirt portion, said flexible wall segments of said middle expandable wall portion being capable of expanding radially outwardly relative to said longitudinal axis of said guide pin body to provide an interference fit with the top nozzle; and
   (c) means insertable within the hole in the top nozzle and interfitted with said guide pin body and said expandable insert for threading with said guide pin body to produce a predetermined displacement of said threading means relative to said guide pin body along said longitudinal axis thereof sufficient to impart a radially and outwardly directed force on said flexible wall segments of said middle expandable wall portion of said expandable insert to produce expanding thereof within the hole of the top nozzle into said interference fit with the top nozzle and thereby secure said guide pin body to the top nozzle.

23. The guide pin assembly as recited in claim 22, wherein said guide pin body also has an upper end nose and an elongated middle cylindrical shaft portion of generally uniform or constant diameter extending between and integrally connected with said upper end nose and said lower attachment base, said upper end nose and middle shaft portion projecting above the hole in the top nozzle.

24. The guide pin assembly as recited in claim 23, wherein said guide pin body also has a locking disc attached thereto at the juncture of said middle shaft portion and said lower attachment base.

25. The guide pin assembly as recited in claim 24, wherein said expandable insert has an upper base portion with a plurality of relief pockets provided in a top surface of said upper base portion, said locking disk being crimpable into at least some of said relief pockets to prevent rotation of said guide pin body relative to said expandable insert.

26. The guide pin assembly as recited in claim 22, wherein said expandable insert includes an annular flange formed about an upper peripheral edge of said upper base portion thereof, said flange projecting radially outwardly from said upper base portion and having a downwardly-facing, outwardly and upwardly inclined, shoulder adapted to seat on a complementarily-shaped internal annular surface defined about the top nozzle hole.

27. The guide pin assembly as recited in claim 22, wherein said lower attachment base includes has upper and lower cylindrical mounting sections and an externally-threaded middle mounting section.

28. The guide pin assembly as recited in claim 27, wherein said upper base portion of said expandable insert has a central bore receiving said upper mounting section of said lower attachment base of said guide pin body.

29. The guide pin assembly as recited in claim 22, wherein said wall segments of said expandable wall portion have respective interior surfaces being inclined upwardly and inwardly with respect to said longitudinal axis of said guide pin body.

30. The guide pin assembly as recited in claim 29, wherein said threading means has an exterior surface inclined upwardly and inwardly relative to said longitudinal axis of said guide pin body and thus complementary to and interfaced with said interior surfaces of said wall segments of said expandable wall portion of said expandable insert.

31. The guide pin assembly as recited in claim 27, wherein said threading means has an internally-threaded central opening for threading said threading means onto said externally-threaded middle section of said lower attachment base of said guide pin body.

32. The guide pin assembly as recited in claim 31, further comprising:

an end cap attachable on said lower mounting section of said lower attachment base of said guide pin body below said threading means.

33. The guide pin assembly as recited in claim 32, wherein said end cap is disposable within said lower skirt portion of said expandable insert.

34. The guide pin assembly as recited in claim 22, wherein said threading means also includes a plurality of radially outward projecting tabs formed on said exterior surface thereof, said tabs being spaced circumferentially from one another so as to project into said slots in said expandable middle wall portion of said expandable insert so as to prevent rotation of said threading means relative to said expandable insert as said threading means is threaded with said guide pin body.

* * * * *